UNITED STATES PATENT OFFICE.

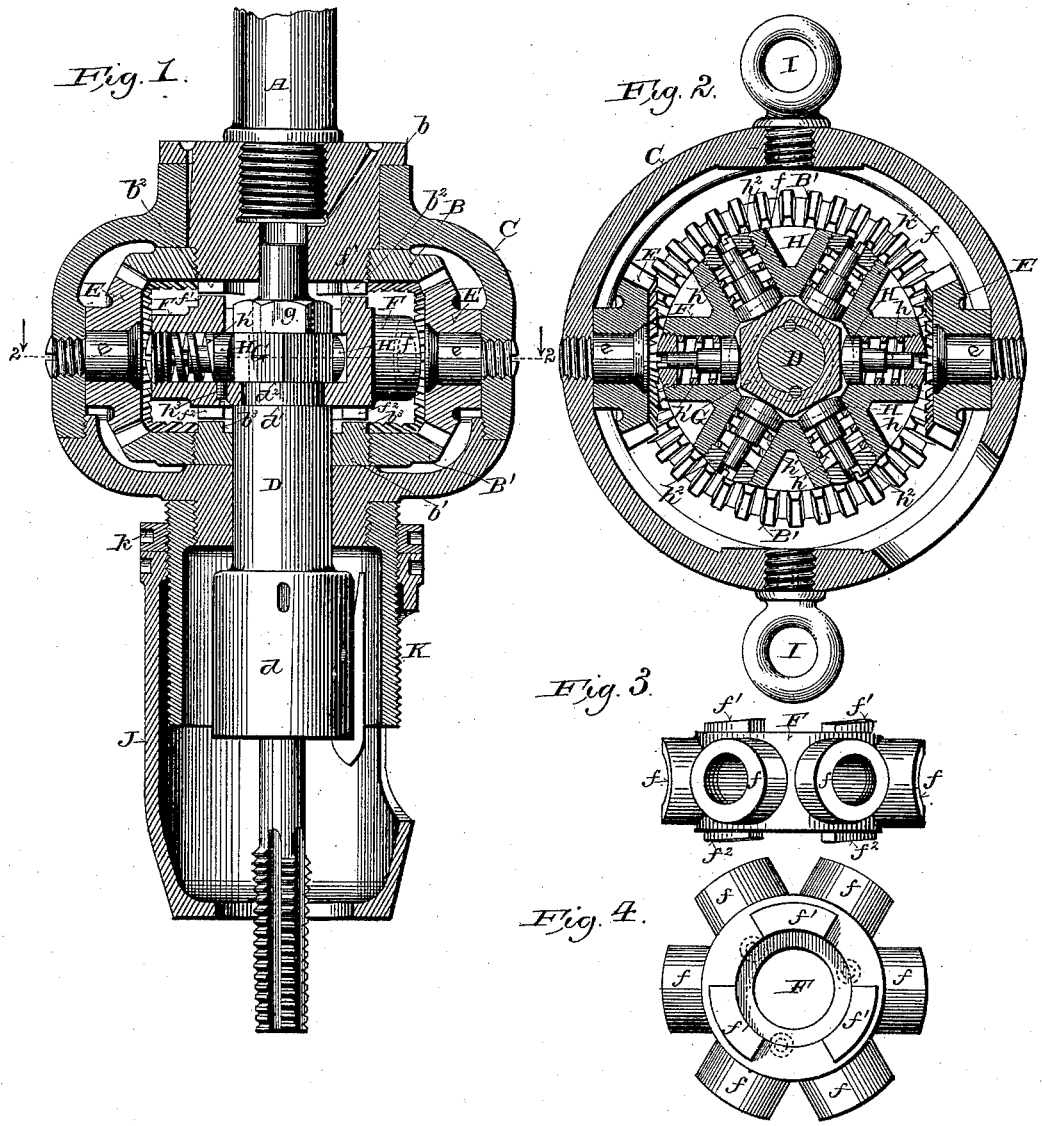

JOHN H. RATHBUN, OF MILWAUKEE, WISCONSIN.

TAPPING DEVICE.

SPECIFICATION forming part of Letters Patent No. 445,615, dated February 3, 1891.

Application filed June 16, 1890. Serial No. 355,640. (No model.)

*To all whom it may concern:*

Be it known that I, JOHN H. RATHBUN, of Milwaukee, in the county of Milwaukee and State of Wisconsin, have invented certain new and useful Improvements in Tapping Devices; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main objects of my invention are to automatically and expeditiously tap holes to a given depth or until the tap "bottoms" in either a drill-press, boring-machine, lathe, or special machine with unskilled labor and without injury to the tap and to set-studs—that is, to screw or turn threaded studs or bolts into tapped or threaded holes.

It consists of certain novel features in the construction and arrangement of the parts composing the device, hereinafter particularly described, and pointed out in the claims.

In the accompanying drawings like letters designate the same parts in the several figures.

Figure 1 is an axial section of a machine embodying my improvements. Fig. 2 is a cross-section of the same in a plane indicated by the dotted line 2 2, Fig. 1. Fig. 3 is a side elevation, and Fig. 4 a plan view, of the clutch-head, through which the spindle is rotated.

A is a shank of the ordinary or suitable form and construction adapted to the socket in the spindle of a drill-press or other machine with which it is to be used. It is screwed into a central threaded aperture of the hub $b$ of a bevel-gear B, which is journaled in the top of the gear-case C, inclosing it.

D is a spindle having a journal-bearing at its upper end in the center of the gear B or of its hub $b$, and a bearing in the bottom or lower side of the gear-case C, in which bearings it is capable of rotary and also of a limited endwise movement. It is formed or provided at its lower end with a holder $d$, adapted to receive and hold the shank of a tap or a variety of removable holders for the attachment of taps of different sizes, drills, or studs to the driving-spindle D, whereby if it should be desirable the holes might be drilled and tapped and studs inserted therein without changing the work for each separate operation or employing different machines therefor.

B' is a bevel-gear like B, mounted within the gear-case C upon the spindle D, which is capable of turning freely therein.

E E are idler bevel-gears journaled on stud-bolts $e$ $e$ in opposite sides of the gear-case C, so as to engage each on opposite sides with the gears B and B', respectively.

For convenience in constructing and assembling the parts, the gear-case is shown as made in two parts, which are screwed or otherwise suitably fastened together, and the gears B and B' are made separate from their hubs $b$ and $b'$, to which they are screwed or otherwise suitably attached. Upon the upper end of the spindle D, between the gears B and B', is loosely mounted the centrally-recessed head F, and within the central recess of said head a polygonal block G is keyed or otherwise secured upon said spindle D. The head F is held in place longitudinally upon the spindle D by a shoulder $d'$ thereon and by the block G, which is seated upon and overhangs a shoulder $d^2$, formed on the spindle D by a further reduction thereof. The block G is prevented from turning on the spindle D by keys, as shown in Fig. 2, or by other suitable means, and is held securely against its seat on shoulder $d^2$ by a nut $g$, screwed upon a threaded portion of spindle D.

The head F is formed with radiating apertures or sleeves $f f$, opening at their inner ends into the central recess therein and corresponding in number and angular position with the faces of the polygonal block G. In these sleeves or apertures are placed yielding bearing-pieces H, having rounded faces presented against the faces of the block G, as shown in Fig. 2, and outwardly-projecting stems $h$ $h$, which are guided in centrally-perforated adjusting-nuts $h^2$ $h^2$, screwed into the outer ends of the sleeves $f f$. Helical springs $h'$ $h'$, interposed between the nuts $h^2$ $h^2$ and bearing-pieces H H, force the latter with an elastic pressure against the faces of the block G, and cause the spindle D to rotate with the head F, except when sufficient resistance is opposed to the rotation of said spindle to compress the springs $h'$ $h'$ and allow the bearing-pieces H H to ride over the angles of the block G.

The gear B has clutch formations $b^2$ $b^2$ on its under side, the gear B' similar clutch formations $b^3$ $b^3$ on its upper side, and the head F has corresponding clutch formations $f'$ and $f^2$ on its upper and under sides, respectively, arranged to engage with the clutch formations $b^2$ or $b^3$ when the head F is raised or lowered with spindle D relatively to the gears B and B', and to clear both such formations $b^2$ and $b^3$ when said head is midway between said gears.

The bearing-pieces H may be held from turning in the sleeves $f$ by screws or keys $h^3$, projecting into grooves or seats in said bearing-pieces, as shown in Fig. 1, so that their rounded faces will be kept in proper position relatively to the faces of the polygonal block G.

Suitable means for preventing the rotation of the gear-case C should be provided. For this purpose one or more rods parallel with the spindle D and attached to the frame of the drill-press or other machine or to any convenient support (not shown) may pass loosely through an eye or eyes I I, projecting laterally from the gear-case C, so as to permit of the advance and withdrawal of the tapping device.

An adjustable gage for arresting the advance of the tap, &c., at the desired point may be conveniently employed. To this end a guard J is screwed upon a threaded sleeve K, attached to and depending from the lower side of the gear-case C concentrically with the spindle D, and a jam-nut $k$ is provided to lock said guard in place when it has been set in the desired position.

My improved device operates as follows: The shank A being rotated turns the gear B' through the idlers E E in the reverse direction, and the top stud or other tool advanced against the work forces the spindle D upward, causing the clutch formations $f'$ on the head F to engage with the clutch formations $b^2$ on gear B. The spindle D will consequently be rotated with the gear B and in the same direction that required to advance the tool or stud into the work. When the guard J is brought into contact with the work, the tap or stud having been advanced to the required depth, the advance of the gear-case C with the inclosed gears will be arrested, and the continued advance of the spindle D will move the head F out of engagement with the clutch formations $b^2$ on gear B into engagement with the clutch formations $b^3$ on gear B'. The tap-stud or the like will therefore be turned in the reverse direction, and consequently withdrawn from the work. When the tap or tool encounters an obstruction offering sufficient resistance to break or injure it, the springs $h'$ $h'$ will be compressed and the bearing-pieces H H yield, permitting them to pass over the angles of the block G without turning the spindle D. By turning the nuts $h^2$ in or out the tension of the springs $h'$ may be adjusted to cause the bearing-pieces H H to grip the block G more or less tightly and to drive the spindle D with greater or less force, as desired.

Other forms of bearing-pieces and springs than those shown and described may be employed to drive the polygonal block G as well as other means for adjusting the pressure of the bearing-pieces on said block. In short, the details of construction of the various parts of the device may be modified without affecting its operation or departing from the spirit of my invention.

I claim—

1. In a tapping and stud-setting device, the combination of a driving-spindle having a polygonal block, a recessed head loosely mounted thereon, and yielding bearing-pieces held in said head so as to engage with said polygonal block, substantially as and for the purposes set forth.

2. In a tapping and stud-setting device, the combination of a spindle having a polygonal part, a driving-head loosely mounted upon said spindle, yielding bearing-pieces inserted in apertures in said head so as to engage the polygonal part of the spindle, springs tending to force said bearing-pieces toward the spindle, and means of adjusting the tension of the springs, substantially as and for the purposes set forth.

3. In a tapping and stud-setting device, the combination of a spindle having a polygonal part, a recessed head mounted upon said spindle around said polygonal part and having radial apertures opening inwardly toward said polygonal part, bearing-pieces placed in said apertures in engagement with said polygonal part, screw-plugs in the outer ends of said apertures, and springs interposed between said plugs and bearing-pieces, substantially as and for the purposes set forth.

4. In a tapping and stud-setting attachment for drill-presses, &c., the combination of a non-rotating gear-case, a shank capable of turning in said case and attachable to the spindle of a drill-press or other machine, oppositely-arranged bevel-gears in said gear-case, one fixed to said shank, oppositely-arranged idle bevel-gears engaged by said first-mentioned gears and journaled in said gear-case, a tool-holding spindle capable of rotation and a limited endwise movement in said gear-case, a head mounted upon said spindle between said gears and bearing, having clutch formations adapted to engage similar formations on said gears, and yielding bearing-pieces carried by said head in engagement with a polygonal block on said spindle, substantially as and for the purposes set forth.

5. In a tapping device, the combination of a suitable gear-case, a driving-shank capable of turning therein, oppositely-rotated clutches journaled in said gear-case and driven by said shank, a tool-holding spindle revoluble and capable of a limited endwise movement in said gear-case, a driving-head mounted upon said spindle between said clutches and arranged to be engaged and driven by either one of them, and yielding bearing-pieces held in said head in engagement with a polygonal part on said spindle, substantially as and for the purposes set forth.

6. In a tapping device, the combination, with a non-rotating gear-case provided with oppositely-arranged clutch-gears, idle-gears meshing therewith, and a driving stem or shank connected with one of said clutch-gears, of a spindle revoluble and capable of endwise movement in said gear-case, and a driving-head mounted upon said spindle between said clutch-gears and provided with yielding bearing-pieces adapted to engage with flattened surfaces on said spindle, said head being movable with said spindle into engagement with either of said clutch-gears, substantially as and for the purposes set forth.

7. In a tapping device, the combination of a rotary tool-holding spindle having flattened surfaces, and a driving-head capable of turning thereon and provided with yielding bearing-pieces adapted to engage with the flattened surfaces on said spindle, substantially as and for the purposes set forth.

8. In a tapping device, the combination of a tool-holding spindle having flattened lateral surfaces, a driving-head mounted thereon and having apertures opening against said flattened surfaces, and yielding bearing-pieces inserted in said apertures so as to engage with the flattened surfaces on the spindle, substantially as and for the purposes set forth.

9. In a tapping device, the combination of a rotary spindle having flattened lateral bearing-surfaces, and a driving-head mounted thereon and provided with separate yielding bearing-pieces adapted to engage the flattened surfaces of said spindle, substantially as and for the purposes set forth.

10. In a tapping device, the combination of a rotary spindle having flattened lateral bearing-surfaces, a driving-head mounted thereon and provided with yielding bearing-pieces made separate therefrom and adapted to engage the flattened surfaces of said spindle, and means of adjusting the pressure of said bearing-pieces against said spindle, substantially as and for the purposes set forth.

11. In a tapping device, the combination of a suitable case or frame, a driving-shank journaled therein, oppositely-rotated clutches journaled in said case and connected with and driven by said shank, a tool-holding spindle revoluble and capable of endwise movement in said case, a driving-head mounted upon said spindle between said clutches and arranged to be engaged and driven by either of said clutches, and yielding bearing-pieces carried by said head in engagement with flattened bearing-surfaces on said spindle, substantially as and for the purposes set forth.

In testimony that I claim the foregoing as my own I affix my signature in presence of two witnesses.

JOHN H. RATHBUN.

Witnesses:
  CHAS. L. GOSS,
  JAMES D. MILLAR.